United States Patent [19]

Phillips

[11] E Re. 29,891

[45] Reissued Jan. 30, 1979

[54] SYSTEM FOR DETECTING SMALL OPENINGS IN HOLLOW BODIES

[75] Inventor: Bryce W. Phillips, Richmond, Va.

[73] Assignee: Reynolds Metals Company, Richmond, Va.

[21] Appl. No.: 821,611

[22] Filed: Aug. 3, 1977

Related U.S. Patent Documents

Reissue of:

[64] Patent No.: 3,453,054
Issued: Jul. 1, 1969
Appl. No.: 619,748
Filed: Mar. 1, 1967

[51] Int. Cl.[2] ..... G01N 21/32

[52] U.S. Cl. ..... 356/237

[58] Field of Search ..... 209/111.7 T, 111.7 R, 209/111.5, 111.6; 356/237, 239; 250/223 R, 223 B

[56] References Cited

U.S. PATENT DOCUMENTS

| | | | |
|---|---|---|---|
| 2,318,856 | 5/1943 | Hoffman | 209/111.7 X |
| 2,332,308 | 10/1943 | Dresser | 209/111.7 |
| 2,453,720 | 11/1948 | Meister | 209/111.7 |
| 2,872,039 | 2/1959 | Lynn et al. | 209/111.7 |
| 3,218,463 | 11/1965 | Calhoun | 209/111.7 X |

*Primary Examiner*—Allen N. Knowles
*Attorney, Agent, or Firm*—Glenn, Lyne, Girard, Clark & McDonald

[57] ABSTRACT

Light source and light sensor on opposite sides of wall of container detect pinhole or crack in container wall, with container rejection means operable by light sensor.

4 Claims, 2 Drawing Figures

INVENTOR
BRYCE W. PHILLIPS

BY Glenn, Palmer & Lyne
ATTORNEYS

SYSTEM FOR DETECTING SMALL OPENINGS IN HOLLOW BODIES

Matter enclosed in heavy brackets [ ] appears in the original patent but forms no part of this reissue specification; matter printed in italics indicates the additions made by reissue.

BACKGROUND OF THE INVENTION

Hollow bodies of containers or the like, and particularly can bodies having one closed end, may require testing to eliminate the possibility of any small opening through any wall of the container being tested, in order to avoid subsequent leakage of liquids or gases packed under pressure in the container. A conventional means for such testing is a Borden Tester, which operates on the basis of detecting air leakage through the walls of the container after maintaining a predetermined pressure difference between air inside and outside the container over a predetermined period of time. Such pressure differential tests systems are less sensitive than desired, and also require longer testing time than is desirable for high speed production line purposes. Accordingly, a more sensitive and faster system of detecting potential leakers has been wanted in the can manufacturing industry.

SUMMARY

The invention provides improved sensitivity and shorter testing times by providing a light source and a light detecting means, so positioned relative to a container that any opening through the container wall transmit light through the wall from the light source, which is detected on the other side of the wall by the light detector. The detector is preferably mounted to collect light inside the container, while the light source directs light all around the outside of the container.

Other details and advantages of the invention will become apparent as the following description of the embodiment thereof in the accompanying drawing proceeds.

DESCRIPTION OF THE DRAWING

The accompanying drawing shows schematically an embodiment of the invention, in which.

DESCRIPTION OF ILLUSTRATED EMBODIMENT

Figure 1:
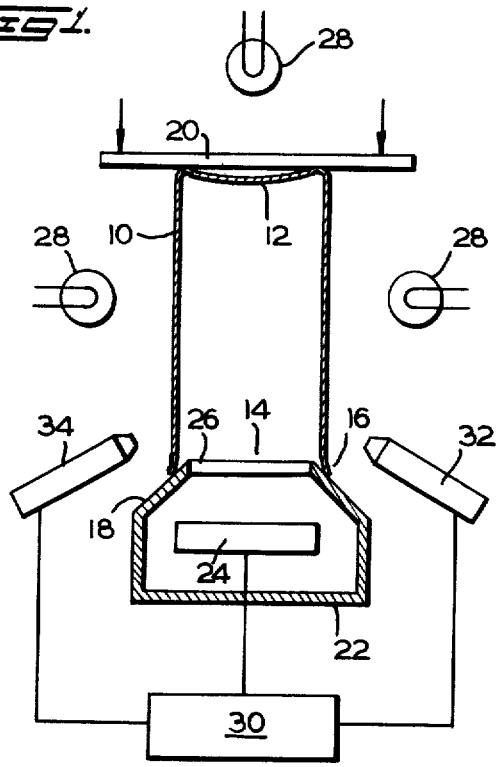
FIG. 1 is a side elevation of apparatus embodying the invention.

Referring now more particularly to the drawing, there is shown a can 10 having a closed end 12, and an open end 14 terminating in a rim 16. The rim 16 rests on a conical support 18, and a bar 20 presses down on the end 12 to wedge the rim 16 against the support 18, thereby tending to open up any incipient crack in the rim 16.

The support 18 constitutes the upper part of a hollow shield member 22 within which there is mounted a light sensing element 24. A central aperture 26 through the support 18 forms an opening concentric with the can 10 and of less diameter than the internal diameter of the rim 14, for purposes of exposing the light sensor 24 to any light entering the interior of can 19, either directly or after reflection from the interior surfaces of the can. It is thus desirable that these internal surfaces be relatively bright.

Figure 2:
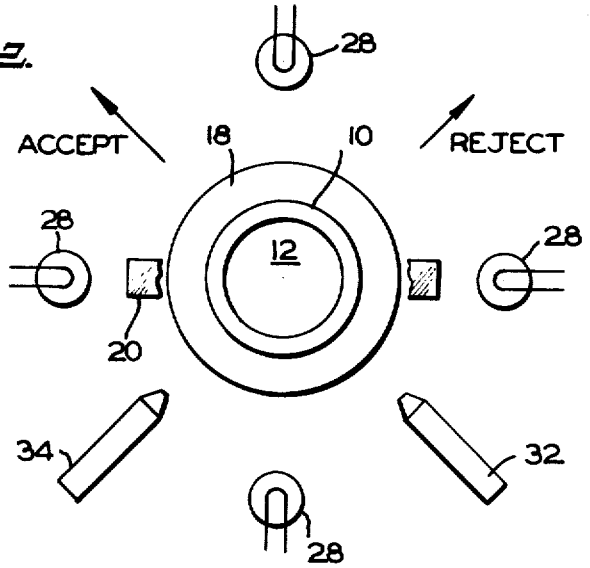
FIG. 2 is a plan elevation of the apparatus shown in FIG. 1.

A plurality of lights 28 are mounted above and around the outside of the can 10, augmented by any reflectors which may be helpful (not shown), in order to pass light through any openings which may occur in the form of pinholes, cracks, or the like in the source of the can 10. The light sensor 24 is connected to suitable electronic means 30 connected in turn to means 32 for moving the can 10 in one direction if no light is detected by sensor 24, and also to means 34 for moving the can 10 in a different direction if light is detected by sensor 24. Such electronic controls and acceptance and rejection means can take various forms well known to those skilled in the art. For purposes of schematic illustration, the means 32 and 34 can take the form of pneumatic or mechanical or other means for acting on the can 10 to move it in different directions, as more particularly shown in FIG. 2. However, for plant purposes several cans may be tested at once at adjacent stations, and the controls must include known delay means for rejecting defective cans after they have moved down the line after testing.

The hold-down bar 20 is preferably of transparent material, so that it will not block passage of light into can 10 while the bar 20 is in contact with the can 10. However, it may be desirable to improve sensitivity of detection by passing the can 10 through successive testing stations in which the hold-down bar is oriented in different directions so that the whole exterior surface of the can is necessarily exposed to light in the course of such successive tests.

The light sensing element 24 is preferably extremely sensitive to even small amounts of light, and consequently should be protected against exposure to the lights 28 during periods when the can 10 is not over the aperture 26. Such protection can be achieved by turning on lights 28 only while the can 10 is in place, or else, for example, by installing suitable shutters over the aperture 26, for purposes of opening the aperture 26 when each test begins and closing it as soon as each test is completed.

The system of the invention is particularly well adapted to bright metal cans, e.g., drawn and ironed aluminum cans. However, it is obvious that the shape and material and surface of the can can be varied without precluding application of the system of the invention to such a can.

As used herein, the term "light" refers to rays detectible by the human eye or by other means.

I claim:

1. Apparatus for testing for any random perforation in the walls of container bodies having brightly reflective interior surfaces, comprising means to make light-tight engagement with the end of the wall at the open end of a container body, means to sense light passed from within the container body to said open end, and light source means to illuminate the outside of the container body walls to be tested, whereby light from said light source means can pass through any random perforation in said walls to be tested, and thence enter the interior of the container to pass directly or by reflection from *the brightly reflective interior surfaces* within the container body *directly* to the light sensing means, thus indicating whether the container body is perforated.

2. Apparatus [according to claim 1,] *for testing for any random perforation in the walls of container bodies having brightly reflective interior surfaces, comprising means to make light-tight engagement with the end of the wall at the open end of a container body, means to sense light passed from within the container body to said open end, and light source means to illuminate the outside of the container body walls to be tested, whereby light from said light source means can pass through any random perforation in said walls to be tested, and thence enter the interior of the container to pass directly or by reflection from within the container body to the light sensing means, thus indicating whether the container body is perforated, and further* including means to press the container body against said [member] *first means* and thereby tend to open up any edge crack at the open end of the container body, whereby light from the light source means will tend to pass through the edge crack to be detected by the light sensing means.

3. Apparatus according to claim 2, in which said light sensing means has its light sensitive element positioned entirely outside of the interior of the container body and in which an open passage is provided for transmission of light passing from the interior of the container body to the light sensitive element.

4. A method for testing the side walls and bottom of an open ended metal container having brightly reflective interior surfaces, which comprises the steps of interposing a light barrier between the interior and exterior surfaces of the container, pressing a portion of the barrier against the end of the side walls at the open end of the container exposing the exterior surfaces of the container to light rays, and sensing light passing *directly or by reflection from the brightly reflective interior surfaces within the container directly* toward the open end of the [can] *container* from its interior, thereby detecting any light passing from outside the container through any random perforation through its walls into the interior of the container.

* * * * *

UNITED STATES PATENT OFFICE

CERTIFICATE OF CORRECTION

Patent No. Re. 29,891 Dated Jan. 30, 1979

Inventor(~~s~~) Bryce W. Phillips

It is certified that error appears in the above-identified patent and that said Letters Patent are hereby corrected as shown below:

Column 2, line 1, the numeral "19" should be --10--.

Column 2, line 28, change "while" to --where--.

Signed and Sealed this

*Twenty-sixth* Day of *February 1980*

[SEAL]

*Attest:*

SIDNEY A. DIAMOND

*Attesting Officer* *Commissioner of Patents and Trademarks*